(12) United States Patent
Palmer

(10) Patent No.: US 9,097,452 B2
(45) Date of Patent: Aug. 4, 2015

(54) METHODS AND APPARATUS FOR THERMAL REGULATION OF PERISHABLE PRODUCTS

(75) Inventor: Roger Keith Palmer, Auckland (NZ)

(73) Assignee: FOODCAP INTERNATIONAL LIMITED, Auckland Central (NZ)

(*) Notice: Subject to any disclaimer, the term of this patent is extended or adjusted under 35 U.S.C. 154(b) by 1671 days.

(21) Appl. No.: 11/665,581

(22) PCT Filed: Oct. 14, 2005

(86) PCT No.: PCT/NZ2005/000270
§ 371 (c)(1), (2), (4) Date: Dec. 18, 2007

(87) PCT Pub. No.: WO2006/041323
PCT Pub. Date: Apr. 20, 2006

(65) Prior Publication Data
US 2008/0220139 A1 Sep. 11, 2008

(30) Foreign Application Priority Data
Oct. 15, 2004 (NZ) ........................................ 536010

(51) Int. Cl.
*A01J 11/04* (2006.01)
*A01J 13/00* (2006.01)
(Continued)

(52) U.S. Cl.
CPC ... *F25D 3/08* (2013.01); *A23B 4/06* (2013.01); *A23L 3/36* (2013.01); *F25D 15/00* (2013.01);
(Continued)

(58) Field of Classification Search
CPC ............... A23B 4/06; A23L 3/36; F25D 3/08; F25D 15/00; F25D 16/00; F25D 2400/38; F25D 2303/0822; F25D 2303/08221; F25D 2303/08222; F25D 2331/804; F25D 17/06; F25D 23/00; A47J 43/00

USPC ........... 99/467, 485–570; 426/129, 312, 524, 426/106, 115, 315, 316, 407, 418, 327, 392, 426/396, 513, 515, 531; 220/592.03, 220/592.01, 592.2; 62/457.1, 62, 89, 115; 29/428; 53/432, 436, 527; 100/910; 165/64, 121; 312/401–408; 439/834
See application file for complete search history.

(56) References Cited

U.S. PATENT DOCUMENTS 1,577,851 A 3/1926 Peschke
2,105,941 A 8/1933 Gleason
(Continued)

FOREIGN PATENT DOCUMENTS

AU 75151/81 B 11/1985
DE 11479 C 11/1980
(Continued)

OTHER PUBLICATIONS

Salmon "Survey of Supply Chain Effectiveness," 2002, Grocery Manufactures Association/Food Products Association, pp. 1-50 at <http://www.gmacbrands.com/publications/docs/SupplyChain.pdf>; Accompanied with listed publications by year on pp. 51-53 at http://www.gmabrands.com/publications.

*Primary Examiner* — Brett Spurlock
(74) *Attorney, Agent, or Firm* — Birch, Stewart, Kolasch & Birch, LLP

(57) ABSTRACT

Thermal regulation of perishable products is achieved using a container (2) having an elongate thermal member (14) which extends into a central region of the container. Thermal regulation is also achieved by selected direction of airflow about walls (4) of the container and providing the container with a rib (5) to facilitate air circulation between adjacent containers.

9 Claims, 6 Drawing Sheets

(51) Int. Cl.

| | | |
|---|---|---|
| *A01J 15/14* | (2006.01) | |
| *F25D 3/08* | (2006.01) | |
| *A23B 4/06* | (2006.01) | |
| *A23L 3/36* | (2006.01) | |
| *F25D 15/00* | (2006.01) | |
| *F25D 16/00* | (2006.01) | |
| *F25D 17/06* | (2006.01) | |

(52) U.S. Cl.
CPC ............... *F25D 16/00* (2013.01); *F25D 17/06* (2013.01); *F25D 2303/0822* (2013.01); *F25D 2303/08221* (2013.01); *F25D 2303/08222* (2013.01); *F25D 2331/804* (2013.01); *F25D 2400/38* (2013.01)

(56) References Cited

U.S. PATENT DOCUMENTS

| | | | |
|---|---|---|---|
| 2,015,941 A | 1/1938 | Gleason | |
| 2,176,384 A | 10/1939 | Varney | |
| 2,346,232 A | 4/1944 | Piret et al. | |
| 2,507,951 A | 5/1950 | Barnes | |
| 2,997,858 A | 8/1961 | Perez | |
| 3,059,452 A | 10/1962 | Griffin | |
| 3,122,748 A | 2/1964 | Beebe, Jr. | |
| 3,272,890 A | 9/1966 | O'Leary, Jr. | |
| 3,411,921 A * | 11/1968 | Shifrin ............... 426/290 | |
| 3,642,263 A | 2/1972 | Pine et al. | |
| 3,894,679 A | 7/1975 | Reifers et al. | |
| 3,922,358 A | 11/1975 | Follett et al. | |
| 3,951,079 A | 4/1976 | Tolleson | |
| 3,986,655 A | 10/1976 | Rynning et al. | |
| 4,488,412 A | 12/1984 | Weaver et al. | |
| 4,498,401 A | 2/1985 | Hannecke et al. | |
| 4,522,835 A | 6/1985 | Woodruff et al. | |
| 4,534,692 A | 8/1985 | Shiomi et al. | |
| 4,643,104 A | 2/1987 | Rasmussen | |
| 4,659,578 A | 4/1987 | Schlegel | |
| 4,736,856 A | 4/1988 | Alneng et al. | |
| 4,744,204 A | 5/1988 | Schlegel et al. | |
| 4,772,480 A | 9/1988 | Yamane et al. | |
| 4,919,955 A | 4/1990 | Mitchell | |
| 4,971,507 A | 11/1990 | Weggelaar | |
| 4,974,291 A * | 12/1990 | McNerney ............... 452/196 | |
| 4,994,294 A | 2/1991 | Gould | |
| 5,129,238 A | 7/1992 | Schwartz et al. | |
| 5,201,437 A | 4/1993 | Burgdorf et al. | |
| 5,222,619 A | 6/1993 | Gregory | |
| 5,305,615 A | 4/1994 | McFadden et al. | |
| 5,353,495 A | 10/1994 | Terabayashi et al. | |
| 5,397,000 A | 3/1995 | Holte et al. | |
| 5,481,852 A | 1/1996 | Mitchell | |
| 5,609,039 A | 3/1997 | Green et al. | |
| 5,670,195 A | 9/1997 | Palmer | |
| 5,704,485 A | 1/1998 | Cautereels et al. | |
| 6,042,859 A | 3/2000 | Shaklai et al. | |
| 6,054,161 A | 4/2000 | Palmer | |
| 6,113,962 A | 9/2000 | Spencer | |
| 6,139,240 A | 10/2000 | Ando et al. | |
| 6,182,053 B1 | 1/2001 | Rauber et al. | |
| 6,194,012 B1 | 2/2001 | Palmer et al. | |
| 6,210,730 B1 | 4/2001 | Mitchell | |
| D444,690 S | 7/2001 | Bond | |
| 6,318,114 B1 * | 11/2001 | Slaughter ............... 62/457.2 |
| 6,430,467 B1 | 8/2002 | D'Amelio et al. | |
| 6,520,352 B2 | 2/2003 | Mondragon et al. | |
| D480,581 S | 10/2003 | Searer | |
| 6,671,578 B1 | 12/2003 | D'Amelio et al. | |
| D490,848 S | 6/2004 | Pope et al. | |
| 7,870,812 B2 * | 1/2011 | Chiu ............... 83/435.15 |
| 2002/0106432 A1 | 8/2002 | Yamagata et al. | |
| 2002/0139126 A1 | 10/2002 | Butler | |
| 2003/0003205 A1 | 1/2003 | Costello | |
| 2003/0015446 A1 | 1/2003 | Talbot | |
| 2003/0152679 A1 | 8/2003 | Garwood | |
| 2003/0170357 A1 | 9/2003 | Garwood | |
| 2004/0081731 A1 | 4/2004 | Hood | |
| 2004/0101386 A1 | 5/2004 | Robey | |
| 2010/0028498 A1 * | 2/2010 | Van Der Drift et al. ......... 426/96 |

FOREIGN PATENT DOCUMENTS

| | | |
|---|---|---|
| DE | 3834483 A1 | 4/1990 |
| DE | 3515728 A1 | 10/1996 |
| DE | 197 14 079 A1 | 10/1998 |
| DE | 19756551 A1 | 7/1999 |
| DE | 29814220 U1 | 7/1999 |
| EP | 0001507 A1 | 4/1979 |
| EP | 0092816 A2 | 11/1983 |
| EP | 0 250 911 A1 | 1/1988 |
| EP | 0 330 473 A1 | 8/1989 |
| EP | 0384885 A2 | 8/1990 |
| EP | 0 391 467 A1 | 10/1990 |
| EP | 0 834 455 A1 | 4/1998 |
| FR | 2 118 881 A | 8/1972 |
| FR | 2708910 A1 | 2/1995 |
| FR | 2736894 A1 | 1/1997 |
| GB | 371907 A | 4/1932 |
| GB | 1 203 403 A | 8/1970 |
| GB | 1444911 | 9/1973 |
| GB | 2154553 A | 9/1985 |
| GB | 2154553 A | 9/1998 |
| IT | 1245758 B | 10/1994 |
| JP | 8-107616 A | 4/1996 |
| JP | 8-178024 A | 7/1996 |
| JP | 9-193936 A | 7/1997 |
| JP | 10-028563 A | 2/1998 |
| JP | 10-045257 A | 2/1998 |
| JP | 2001-248949 A | 9/2001 |
| JP | 62-166872 A | 1/2002 |
| JP | 2002/005689 A | 1/2002 |
| NL | 1013969 C | 10/2000 |
| RU | 2221972 C2 | 1/2004 |
| WO | WO-89/06208 A1 | 7/1989 |
| WO | WO-91/16237 A1 | 10/1991 |
| WO | WO94/11269 A1 | 5/1994 |
| WO | WO-94/11269 A1 | 5/1994 |
| WO | WO 96/36233 A | 11/1996 |
| WO | WO 99/12428 A1 | 3/1999 |
| WO | WO-99/15415 A1 | 4/1999 |
| WO | WO-00/75584 A1 | 12/2000 |
| WO | WO-01/21514 A1 | 3/2001 |
| WO | WO-01/91565 A1 | 12/2001 |
| WO | WO-02/059007 A1 | 8/2002 |
| WO | WO-2006/041323 A | 4/2006 |

\* cited by examiner

METHODS AND APPARATUS FOR THERMAL REGULATION OF PERISHABLE PRODUCTS

BACKGROUND OF THE INVENTION

1. Field of the Invention

This invention relates to thermal regulation of perishable products such as food products, and has particular relevance to cooling moat during meat processing.

Throughout this specification it is to be understood that references to "meat" Include all forms of meat of all descriptions generally considered to be edible for example, including without limitation, beef, lamb, pork, poultry, fish and offal.

2. Description of Related Art

There is a requirement in many industries for controlling the temperature of perishable products, particularly foodstuffs such as meat.

In the meat processing industry, for example, slaughtered meat must be cooled according to defined cooling specifications.

In particular, it is highly advantageous to cool the meat relatively quickly after slaughter so as to minimise bacterial growth.

Meat cuts are usually vacuum packed in plastic bags following slaughter. The bags are typically boxed in cardboard cartons and blast chilled. They are then palletised and transferred to air chillers. The process is inefficient requiring significant handling, and it is capital intensive.

BRIEF SUMMARY OF THE INVENTION

It is an object of the present invention to provide an improved method or apparatus for temperature regulation or control of perishable products.

A further or alternative object is to allow meat to be cooled quickly and/or efficiently. Alternatively or additionally it is an object of the invention to provide a method or apparatus for temperature regulation or control which will at least go some way to overcoming disadvantages associated with known constructions or methods, or at least to provide the public with a useful alternative.

Accordingly in a first aspect the invention consists in a post slaughter meat processing chiller having:
a container support structure adapted to support a plurality of containers of meat,
a plurality of air duct outlets arranged to direct a flow of cooled air over an external surface of each of a plurality of containers.

Preferably the chiller includes container transport means to transport containers to and from the support structure.

Preferably the containers are reusable rigid containers.

Preferably the structure includes container locating means arranged to facilitate location of each container in the structure, the locating means being provided such that containers are spaced apart a predetermined distance to allow air flow about adjacent containers.

Preferably the container transport means automatedly transports containers from an entry to the chiller to one or more selected positions in the chiller, and from the one or more selected positions to an exit from the chiller.

Preferably control means are provided to control the temperature and velocity of airflow about the containers.

Preferably control means are provided to control the time for which containers are present in the chiller.

In a second aspect the invention consists in a method for the post slaughter cooling and storage of meat, the method including the steps of:
placing the meat within a rigid reusable container having at least one side wall, placing the container in a chiller such that the at least one side wall is exposed to a flow of air in a temperature range of substantially −2 degrees Celsius to 3 degrees Celsius at a velocity of substantially 1 meter per second to 2 meters per second.

Preferably the temperature is substantially −1.5 degrees Celsius. Preferably the airflow velocity is substantially 1.5 meters per second.

Preferably the airflow is directed about or across two side walls of the container.

In a third aspect the invention consists in a method for the post slaughter cooling and storage of meat, the method including the steps of:
providing a rigid reusable container having a spacing means,
placing meat in the container,
placing the container in a chiller adjacent to another container such that the spacing means of at least one container provide a separation between walls of the adjacent containers to allow airflow between the walls.

Preferably the spacing means comprise a projection from a side wall of the container.

Alternatively or in addition the spacing means comprise a contoured wall, such as a tapered wall.

Preferably the spacing means comprise a rib.

Preferably the method includes the step of using the spacing means for contact or engagement with a lifting mechanism to lift and/or transport the container.

Preferably the method includes the step of using the spacing means to stack empty containers.

In a fourth aspect the invention consists in a method for the post slaughter cooling and storage of meat, the method including the steps of:
placing the meat within a rigid reusable container having at least one substantially planar side wall,
placing the container in a chiller such that the side wall is exposed to a flow of cooled air substantially parallel to the wall.

Preferably the cooled air flow is in a temperature range of substantially −2 degrees Celsius to 3 degrees Celsius.

Preferably the airflow velocity is substantially 1 meter per second to 2 meters per second. Preferably the temperature is substantially −1.5 degrees Celsius. Preferably the airflow velocity is substantially 1.5 meters per second.

In a fifth aspect the invention consists in a container for perishable products, the container including a base and one or more walls dependent therefrom, and an elongate thermal member extending from the base into a substantially central region of the container, the thermal member including a cavity adapted to be filled with a substance having predetermined thermal properties to thereby control the temperature of a product placed in the container. Preferably the thermal member is removable from the container.

Preferably the thermal member comprises part of a compression means to exert a compressive force on the product placed in the container.

Preferably the compression means includes an upper plate attachable to the thermal member.

Preferably the compression means includes a lower plate adapted for location one or adjacent to the base of the container and the thermal member depends from the lower plate.

Preferably the compression means includes a clamp means to engage the upper plate with an end of the thermal member remote from the base.

Preferably an end of the thermal member remote from the base includes clamp engagement means to engage with the clamp.

Preferably the upper plate includes a biasing means to exert a force on the product.

In a sixth aspect the invention consists in apparatus for treatment or storage of meat, the apparatus including a portable containment means for containing the meat and a compression means to apply compression to meat contained within the containment means, the compression means including a cavity for containing a refrigerated substance.

In a seventh aspect the invention consists in a method of storing or treating meat, the method including the steps of:
providing a container;
placing a refrigerated object or an object containing a coolant into the container; placing the meat into the container adjacent to the object;
placing the meat under compression.

Preferably the refrigerated object comprises an elongate member which may extend from the base into a substantially central region of the container, the thermal member including a cavity adapted to be filled with the coolant.

Preferably placing the meat under compression includes attaching an upper plate to the elongate member and applying pressure to compress the meat between the upper plate and a lower plate provided at the base of the elongate member.

In an eighth aspect the invention consists in a method of storing or treating meat, the method including the steps of:
providing a container;
placing a refrigerated object or an object containing a coolant into the container; placing the meat into the container adjacent to the object;
placing the container into a chiller.

The invention also broadly consists in any new feature or combination of features disclosed herein.

BRIEF DESCRIPTION OF THE DRAWINGS

At least one preferred embodiment of the invention will be described below with reference to the accompanying drawings in which.

DETAILED DESCRIPTION OF THE INVENTION

Figure 1:
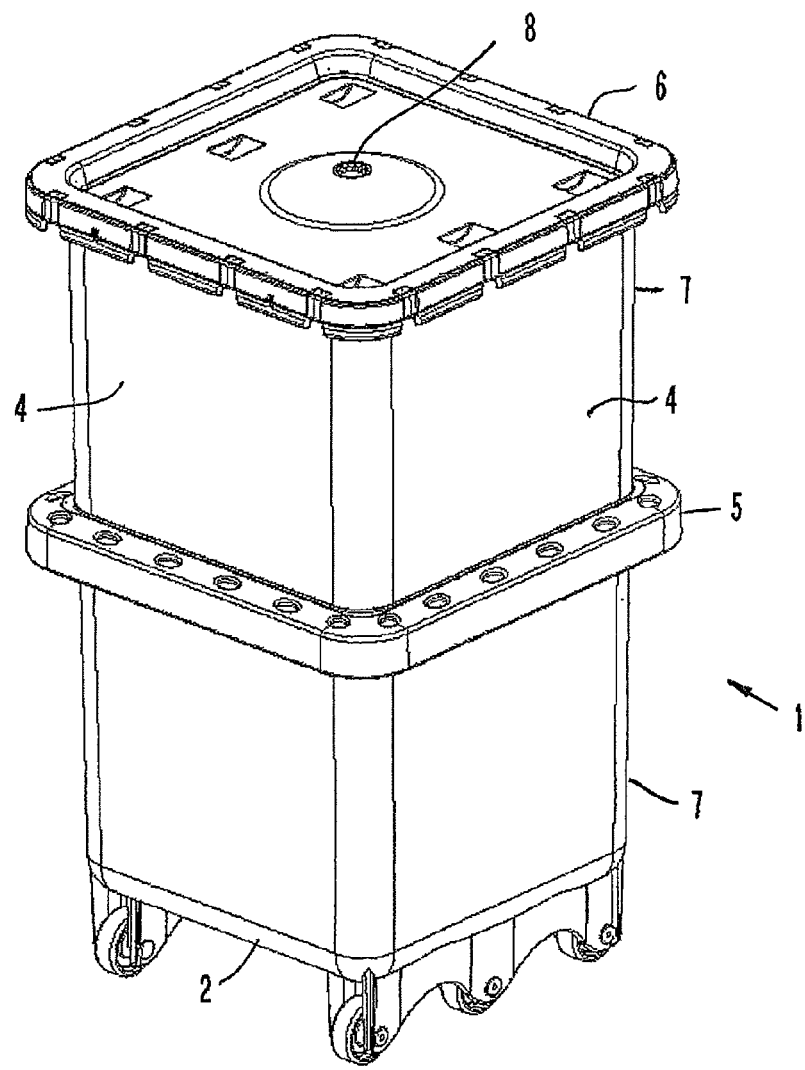
FIG. 1 is an isometric view of a container for containing perishable products such as meat.

Referring to the drawings, FIG. 1 shows a portable container generally referenced 1 which may be used to store, treat or transport perishable products such as cuts of meat. The container has a base 2 and one or more side walls 4 which depend from the base. A lid 6 may be fixedly attached to the container to provide a substantially fluid tight seal.

The lid may include a valve 8 for the selective introduction or removal of fluids to or from the container to thereby control the atmosphere, content and/or pressure within the container. A projection or rib 5 is also provided. A taper 7 may be provided in wall or walls of the container.

Figure 2:
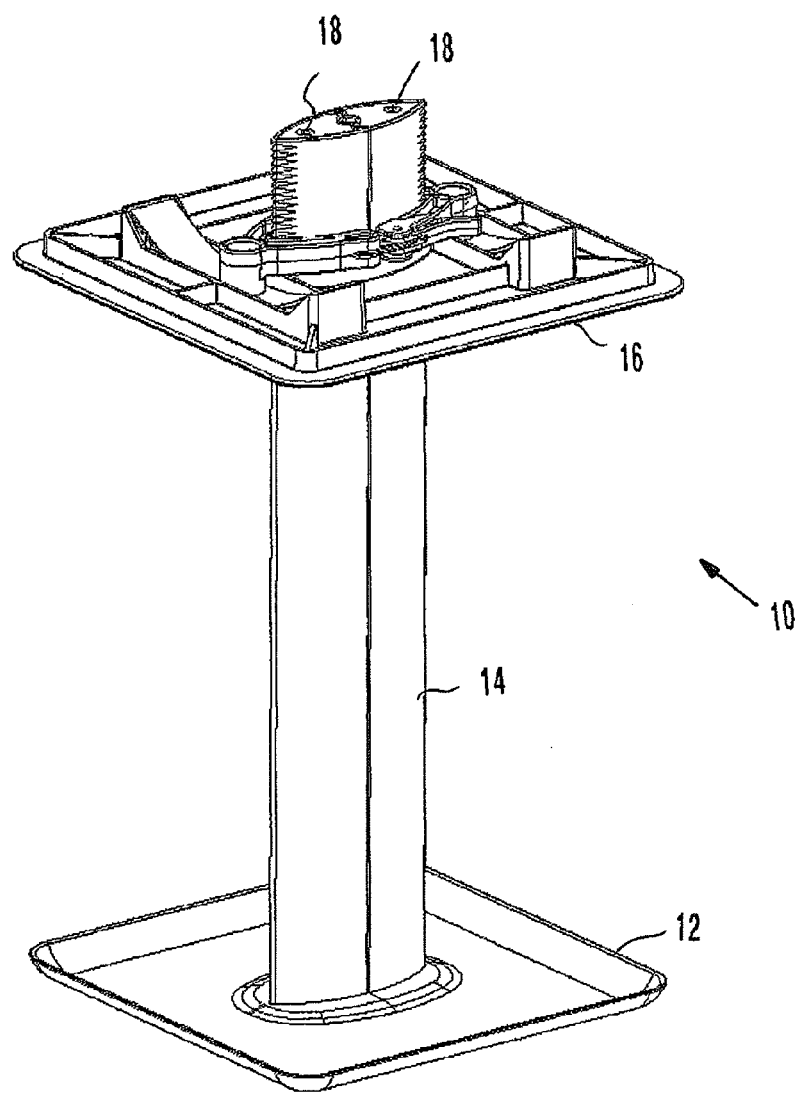
FIG. 2 is an isometric view of compression apparatus for location within the container shown in FIG. 1.

Turning to FIG. 2, apparatus for providing compression to meat, particularly meat primals is shown generally referenced 10. The apparatus 10 is dimensioned for location within container 1, and generally comprises a base plate 12 to which a central rod 14 is attached, and an upper plate 16. Rod 14 provides a thermal function as will be described further below. Although it is advantageous to allow the compression apparatus to be removed from the container 1, it will be seen by those skilled in the art that the rod 14 could depend directly from the base 2 of the container.

In use, upper plate 16 of the compression apparatus is removed from the central rod 14 (as will be described further below), and the base plate 12 and rod 14 are located within the container, the base 12 being provided in contact with the base 2 of the container 1.

The meat cuts are then placed in the container about the central rod 14, being stacked upwardly from the base 12. Then, the upper plate 16 may be applied to compress the meat cuts within the container. This general compression method is disclosed in our U.S. Pat. Nos. 6,194,012 and 5,670,195, the contents of which are incorporated herein by reference in their entirety.

The central rod 14 may include one or more cavities or compartments (not shown) which preferably extend substantially the entire length of the rod 14, so that it is substantially hollow. Of course, the rod 14 may take a variety of different shapes or forms. In a preferred embodiment, the rod 14 takes the form shown in the drawing Figures and includes openings 18 which allow an appropriate coolant substance to be provided within the rod. The rod may be constructed from a variety of different materials; however, we have found that Acetal has advantages of food safety cost, ease of manufacture and sufficient strength and durability.

In the preferred embodiment, we fill the rod 14 with water, and then refrigerate the water until it is in the form of ice. The thermal conductivity of the Acetal material is sufficient to enable thermal energy from the meat placed in the container to be absorbed by the ice. We have found that this considerably assists the cooling of freshly slaughtered meat in the container down to an appropriate cooling level that provides an improved quality of meat product.

In particular, the central location of the rod within the middle of the container means that heat energy, which would normally take a significant period of time to migrate from the centre of the container through the container wall and into the surrounding environment (which will typically be a chiller), is removed much more quickly.

The construction also has the advantage that the rod 14 has the dual function of providing a structural member which allows compression to occur between the plates 12 and 16 (i.e. the rod 14 can withstand significant tensile forces) while also providing a cooling function. Those skilled in the art will appreciate that cooling materials other than water may be used.

Figure 3:
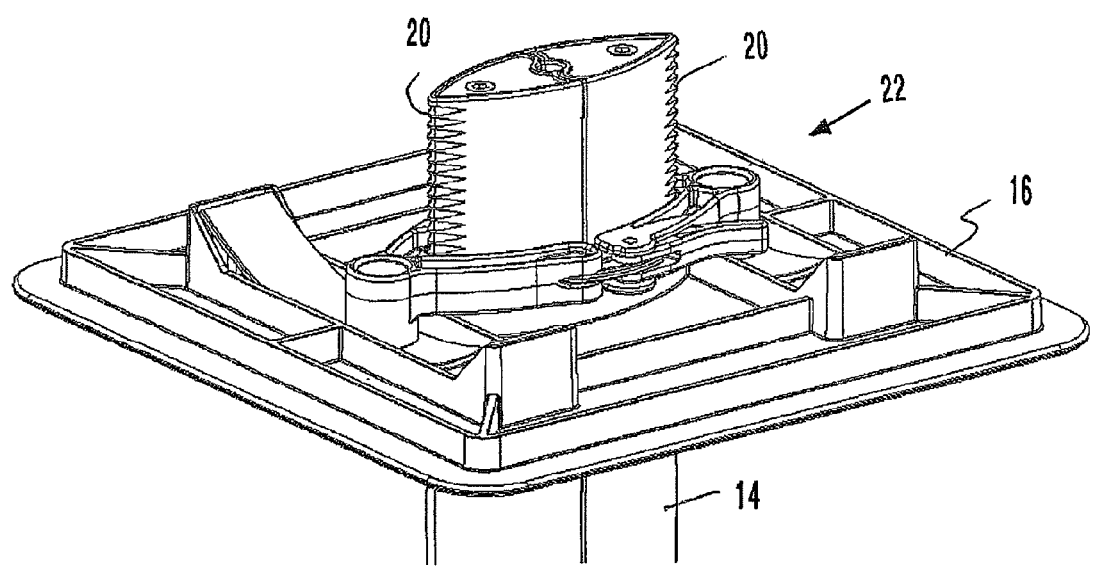
FIG. 3 is a partial isometric view of the apparatus of FIG. 2 showing an upper end of the compression apparatus in greater detail.

Turning to FIG. 3, a more detailed view of the assembly associated with upper plate 16 is shown. It can be seen from this view that the outer surface of an upper portion of the rod 14 includes teeth 20 between or about which a clamp assembly engages in use.

Figure 4:
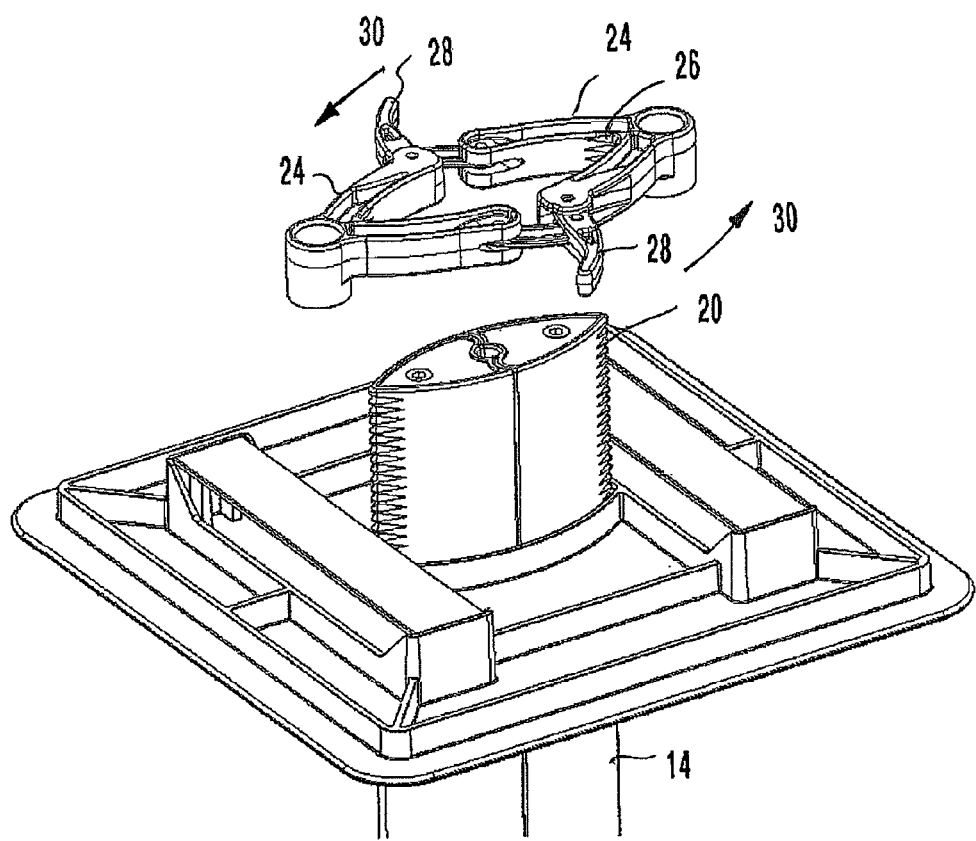
FIG. 4 is an partial exploded view of the apparatus of FIG. 3 illustrating a clamping apparatus in an open position.
Figure 5:
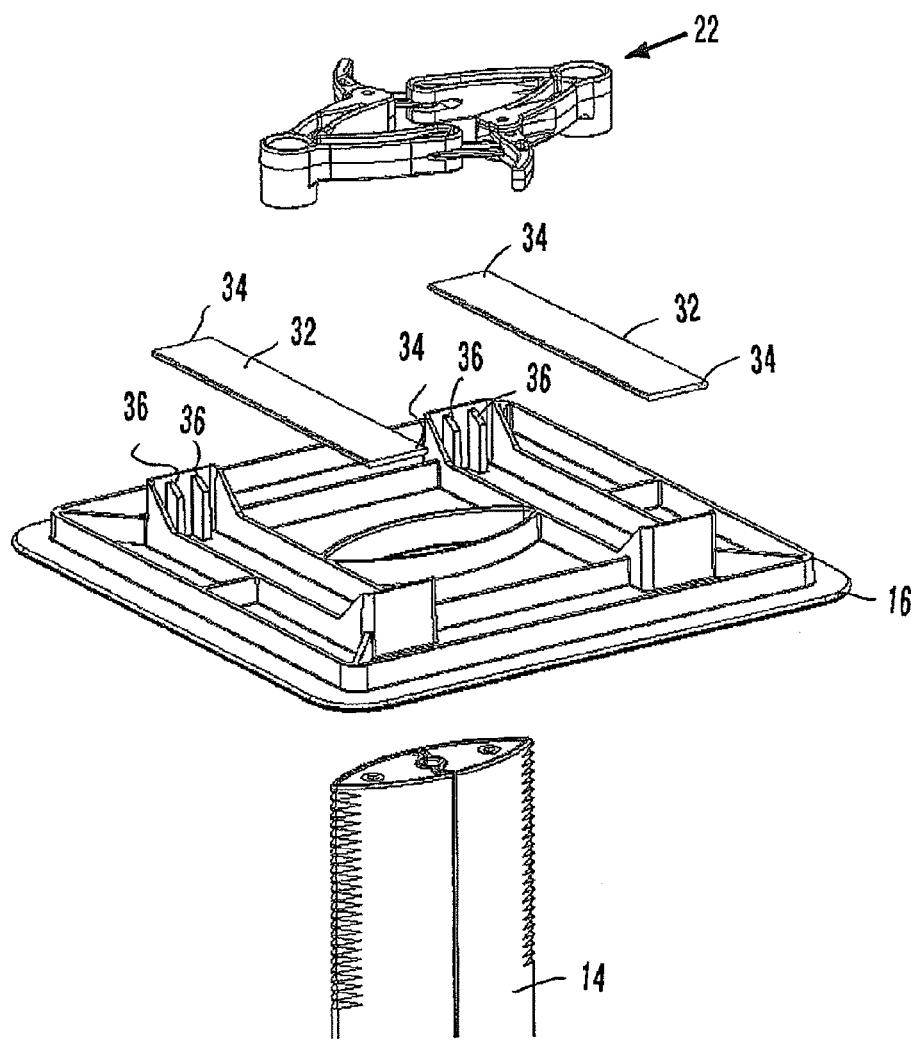
FIG. 5 is a fully exploded isometric view of the apparatus of FIGS. 3 and 4.

In FIG. 4, the clamp assembly is shown in more detail, comprising two members 24, each of which have recesses 26 adapted to accommodate one or more teeth 20 of the central rod 14. Levers 28 are pivotally engaged with each of the members 24 and may be rotated in a direction as shown by arrows 30 to provide a cam action that draws members 24 together so that the teeth 20 engage with recesses 28. This securely engages the clamp assembly with the rod 14. Turning to FIG. 5, it can be seen that the upper plate 16 includes a biasing means comprising at least one (but preferably two) spring members 32. The ends 34 of each spring member sit on ledges 36. This arrangement allows central portions of the spring members 32 to deflect downwardly under pressure applied by the clamp members 24. Since the spring members 32 are constructed from an appropriately resilient material, such as spring steel, an even and desired pressure may be applied to the upper plate to therefore compress the cuts that are held captive in the container between the upper and lower plates.

From the foregoing it will be seen that the invention allows the core of a container, including a foodstuff, to be cooled rapidly. In the meat industry, this substantially increases the maximum permissible initial temperature of primal cuts when they are placed into the container for subsequent treatment or transport.

Figure 6:
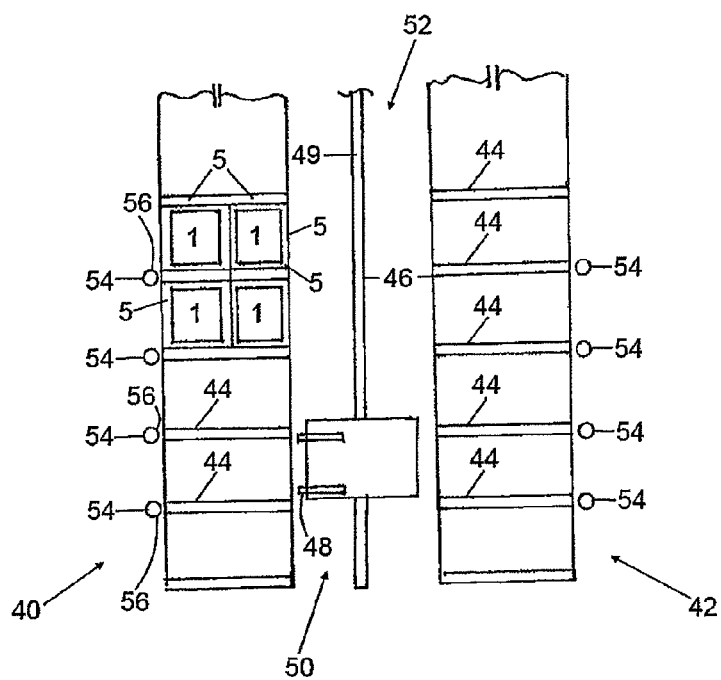
FIG. 6 is a schematic plan view of a chiller.
Figure 7:
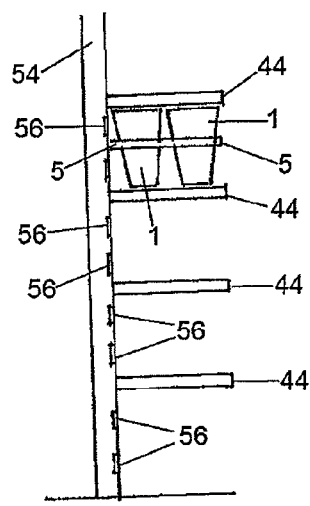
FIG. 7 is a partial schematic side elevation of the chiller of FIG. 6.

A chiller installation in which containers such as those shown in FIG. 1 which contain post-slaughter meat may be stored as shown in FIGS. 6 and 7. Those skilled in the art will realise that the container shown in FIG. 1 may contain post-slaughter meat which may be cooled in accordance with required standards with or without the apparatus shown and described with reference to FIGS. 2 to 5 of the drawings.

Referring to FIG. 6, a schematic plan view of a chiller is shown. The chiller has structures 40 and 42 which enable containers 1 to be stacked within the chiller. In the example shown, containers 1 are stacked two deep, but other configurations may be used. The structures have arms (although other configurations could be used such as simple shelves, for example) 44 which support the container by cradling the base of the container. Most preferably the arms 44 comprise a section, such as a "U" shaped section within which wheels provided on the container base are received. The arms may alternatively be provided in a direction perpendicular to that shown in FIG. 6. The rib 5 may also be used to facilitate lifting and carrying the container for transportation purposes.

A container transport system is provided. This comprises a mobile crane unit which is preferably automated, being designed to traverse the length of structures 40 and 42 in a space 46 in the space provided therebetween. The transport unit includes a lifting mechanism 48 which is moveable along a rail 49. The lifting mechanism 48 in this example may engage with one or two containers (for example to engage with rib 5) so as to lift those containers to or from the locating arms 44 on the structures 40 and 42. In this way, the containers may be moved into and out of the chiller via entries or exits 50 and 52. Those skilled in the art will appreciate that in practice a number of the chiller structures as shown in FIGS. 6 and 7 may be replicated and provided in the one insulated facility to thereby provide a chiller having an overall desired storage capacity.

In a preferred embodiment the rib 5 provides a standardised external feature that may be used by the transport means to automatedly transport the container by providing an engagement point for lifting and carrying the container. For example the chiller also has a number of ducts 54 which have outlets 56. The ducts convey chilled air for distribution through the outlets 56 at a desired temperature adjacent to the containers 1. As can be seen from the drawings, the ribs 5 and/or the taper 7 of the containers provide a space between which air can circulate about the sides of the container. This provides more efficient use of the airflow about the sides of the container to thereby improve cooling efficiency. It can also be seen that the ducts are conveniently located so that the outlets duct air between the containers so that the air moves across the walls of the containers in a direction substantially parallel to at least some of the walls to efficiently remove heat.

In one embodiment the ribs 5, apart from providing a spacing means between adjacent containers, may also provide structural strength, be used to nest or stack empty containers (by preventing one container being stuck within another), and can provide a lifting collar.

In a preferred embodiment, the temperature of the air is in the range of substantially −2 degrees Celcius to 3 degrees Celcius, and the airflow velocity passed the container walls is approximately 1 meter per second to 2 meters per second. Most preferably, airflow temperature is substantially −1.5 degrees Celcius and the airflow velocity is 1.5 meters per second.

The invention allows standards to be met such as chilling non-frozen post slaughter meat to less than 7° C. within 24 hours, or 4 degrees Celsius within 60 hours if processing will be delayed for more than 96 hours. In a preferred embodiment the invention allows meat primals to be brought down to below 2 degrees Celsius (preferably to just above −2° C.). The total quantity of meat within a container is preferably up to 150 kg of bone out product or 100 kg of bone-in product.

Where in the foregoing description reference has been made to specific components or integers of the invention having no equivalents, then such equivalents are herein incorporated as if individually set forth.

Although this invention has been described by way of example and with reference to possible embodiments thereof, it is to be understood that modifications or improvements may be made thereto without departing from the scope of the invention as defined in the appended claims.

The invention claimed is:

1. A container for perishable products, the container comprising:
    a base plate and one or more walls dependent therefrom;
    a top plate;
    a cooling substance;
    an elongate thermal member extending from the base plate into a substantially central region of the container, the elongate thermal member including a cavity filled with the cooling substance to thereby reduce the temperature of the perishable products placed in the container; and
    a compression device configured to exert a downward compressive force on the perishable product,
    wherein the elongated thermal member constitutes part of the compression device, the compression device further comprises a clamping assembly, and an engagement of the clamping assembly and the elongated thermal member pulls the top plate toward the base plate,
    wherein an end of the elongated thermal member remote from the base includes a clamp engagement member to engage with the clamping assembly, and
    wherein the clamping assembly comprises:
        two clamping members each having a recess configured to accommodate the clamp engagement member of the elongated thermal member; and
        levers pivotally engaged with each of the clamping members and configured to operatively draw the two clamping members toward each other so as to securely engage the clamping assembly with the elongated thermal member.

2. A container as claimed in claim 1, wherein the elongated thermal member is removable from the container.

3. A container as claimed in claim 1, wherein the compression device engages with the top plate which is attachable to the elongated thermal member.

4. A container as claimed in claim 1, wherein the compression device includes a lower plate adapted for location on or adjacent to the base of the container and the elongated thermal member depends from the lower plate.

5. A container as claimed in claim 1, wherein the clamping assembly engages the top plate with an end of the elongated thermal member remote from the base.

6. A container as claimed in claim 3, wherein the top plate includes a biasing device to exert a force on the product.

7. A container as claimed in claim 1, wherein the cooling substance is at a temperature below that of the perishable product.

8. A container as claimed in claim 1, wherein the cooling substance is refrigerated or frozen water.

9. A container as claimed in claim 1, wherein the elongate thermal member is present before the introduction of the perishable product.

\* \* \* \* \*